July 3, 1956     J. G. LAWSON     2,752,845
ELECTRICAL PERCOLATORS HAVING PROJECTING HEATING ELEMENTS
Filed Dec. 23, 1953
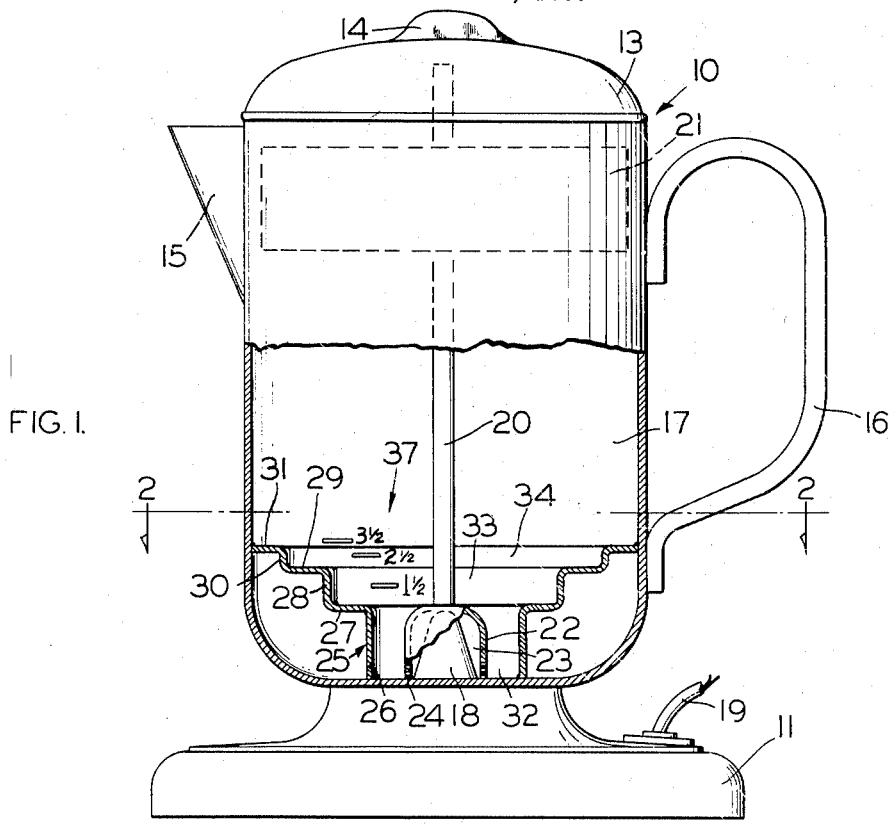
FIG. 1.
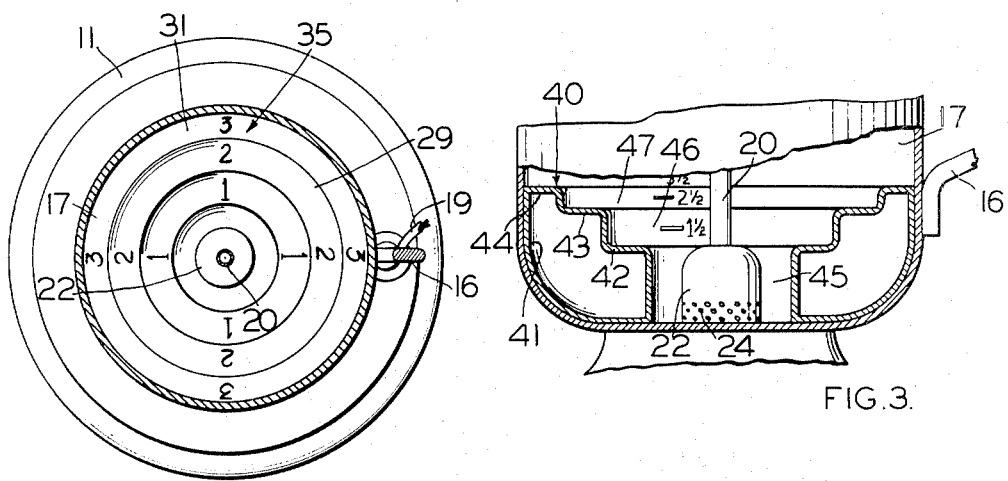
FIG. 2.
FIG. 3.
INVENTOR
JACK G. LAWSON
BY *Hilmand O. Vogel*
ATTORNEY

United States Patent Office 2,752,845
Patented July 3, 1956

2,752,845
ELECTRICAL PERCOLATORS HAVING PROJECTING HEATING ELEMENTS

Jack G. Lawson, Chicago, Ill.

Application December 23, 1953, Serial No. 399,937

4 Claims. (Cl. 99—285)

This invention relates to coffee-making apparatus of the percolator type. More particularly, this invention relates to an improved coffee maker of a type in which variable quantities of coffee beverage can be made.

The present invention is particularly adapted to a type of percolator wherein a heating element at the base of the percolator projects upwardly into the liquid reservoir, the heating element being of a conventional electric type. In this type of percolator, now in general use, it is usually recommended that four to eight cups of coffee can be made at one time within the unit. However, the making of a single cup, or perhaps two cups, is generally not recommended since the water requirement for such a quantity of coffee would not be sufficient within the reservoir to cover or submerge the heating element contained at the base. Thus, the heating element would very quickly burn out since it would not be suitably covered with the liquid. In many instances, the user decides to make just one cup of coffee, and does not want to make any additional amount since he does not have any immediate use for it. It is a prime object of this invention, therefore, to provide an improved percolator of the projecting heating-element type wherein one, two, or three cups of coffee can be made as required.

Another object is to provide an improved percolator having a reservoir at the base of which a projecting heating element is provided, the percolator including a series of vertically disposed chambers in which one, two, or three cups of coffee may be made, all of the chambers being disposed so that the filling with the liquid of one or more of the chambers will submerge the heating element.

A still further object is to provide an improved percolator having a reservoir including a projecting heating element, the percolator having an annular narrow chamber surrounding the heating element wherein a minimum quantity of one cup of coffee can be made, the liquid level and the chamber being such as to cover the projecting heating element.

Still another object is to provide an improved percolator comprising a reservoir having a bottom wall which includes an upwardly extending element, the reservoir also including a measuring unit having a series of vertically extending annular walls disposed in step-like formation, the walls having indicia markings, and defining within the reservoir a plurality of vertically disposed chambers adapted to receive measured quantities of water used in the coffee-making operation.

A still further object is to provide an improved percolator having a base with an upwardly extending heating projection, the heating projection being surrounded by a vertically extending annular wall defining a chamber in which a minimum quantity of water may be placed for the coffee-making operation, the chamber being so confined that the minimum quantity of water will have its upper liquid level disposed to cover or submerge the heating element.

These and further objects will become more readily apparent from a reading of the description when taken in connection with the accompanying sheet of drawing.

In the drawing:

Figure 1 is a side-elevational view partially in section of an improved percolator;

Figure 2 is a cross-sectional view through a percolator shown along the line 2—2 of Figure 1; and Figure 3 is a cross-sectional view through a portion of an improved percolator, showing a modified construction permitting the making of minimum quantities of coffee in the percolator.

Referring now to the drawing, a percolator is generally designated by the reference character 10. The percolator includes a base 11 and a cover 12. The cover 12 is provided with a conventional glass dome 14. A spout 15 is provided on the percolator 10, and a handle 16 is suitably connected to the percolator.

The percolator includes a container or reservoir 17 at the base of which a heating element 18 is provided. Electric wires 19 extend outwardly from the base 11 to provide electric current to the heating element 18 in a conventional manner.

A fountain tube 20 is disposed in the reservoir 17. The fountain tube is suitably connected and extends through a coffee container 21, which is conventional, consisting of a series of openings or holes, not shown, through which the liquid may drain during percolation. The lower end of the fountain tube 20 is provided with a dome-shape cover 22 which covers the heating element 18 and provides a heating well 23. The cover 22 may include a series of openings 24 through which the liquid may enter into the heating well 23.

At the lower end of the reservoir 17, a measuring unit 25 is provided. The measuring unit 25 includes a vertically extending cylindrical wall 26 which encloses the wall 26, in turn being connected to a horizontally extending annular wall 27. The wall 27 in turn is connected to a vertically extending cylindrical or annular wall 28 which in turn is connected to a horizontal wall 29. From the horizontal wall 29, a cylindrical or annular wall 30 extends, this latter wall being connected to a horizontal wall 31 which in turn may be suitably connected by brazing or other means to the inner wall of the reservoir 17. The lower end of the cylindrical wall 26 likewise may be suitably connected to the lower wall of the reservoir 17. The vertical and horizontal walls are positioned in step-like configuration to provide chambers 32, 33, and 34, these chambers being vertically spaced within the reservoir 17. Indicia markings 1, 2, and 3 are suitably disposed, as indicated in Figure 2, in the horizontal walls 27, 29, and 31. These indicia markings may be embossed so that they will be readily and easily visible by a person looking into the top of the percolator 10. As indicated at 36, 1½, 2½, and 3½ indicia markings also may be placed on the side wall of the reservoir 17 so that a person making coffee can readily see these markings.

A modified form of the invention is shown in Figure 3. The percolator 10 is similar, and like reference characters will be used. In this percolator 10, however, a separable or removable measuring insert 40 is utilized. This device 40 is adaptable to percolators which are already in use, and do not have the self-contained unit as indicated in the preferred embodiment. The measuring device 40 comprises an outer wall 41 which is shaped in accordance with the lower portion of the reservoir 17 so that it fits in snug relationship. The device 40, in fact, may be made to have a slight press fit within the percolator 10 so that it will remain in position despite the entrance of liquid into the reservoir 17. The device 40 also includes annular steps 42, 43, and 44, providing annular chambers 45, 46, and 47. The device 40 also has suitable indicia markings to indicate 1½, 2, 2½, and 3 cup measurements.

In the use of the preferred embodiment, if the user wishes to make a single cup of coffee, he merely fills the chamber 32 with water to a point where the water level is even with the horizontal wall 27. It can be seen that the heating element 18 is submerged or is positioned below the level of the liquid. Thus, there is no danger of the element becoming overheated and burning out. If the user wishes to make two cups of coffee, he merely adds enough water until the chamber 33 is filled. For three cups of coffee, he adds an additional amount of water until the chamber 34 is filled. Thus, it is clear that small quantities of coffee may be made in a percolator of the type wherein the base has the upstanding heating element.

The device 40 is inserted in conventional coffee percolators which do not have the provision shown in the preferred embodiment. The insert 40 has a sufficiently tight fit with the inner wall of the reservoir 17 so that it will remain in position while water is added to the reservoir. The device is utilized in the same manner, and accomplishes the same results as the measuring unit 25 shown in the preferred embodiment.

Thus, it can be seen that an improved percolator has been disclosed, and that the objects of the invention have been fully achieved. It must be realized that further changes may be made which do not depart from the spirit of the invention as disclosed nor the scope thereof as defined in the appended claims.

What is claimed is:

1. A coffee beverage-making apparatus comprising a water-holding receptacle, said receptacle including a base, an electrical heating element supported on and projecting upwardly from said base, into said receptacle, a tubular fountain member disposed in said receptacle, said fountain member having a coffee container at one end and an enlarged tubular member at the other end, said enlarged tubular member enclosing said heating element to provide a heating well, a measuring unit disposed at the base of said receptacle, said unit comprising a plurality of vertical cylindrical walls, a first vertical wall having a certain internal diameter, said first wall encircling said heating element to provide a first chamber, second and third walls having progressively greater internal diameters to provide second and third chambers, a first annular horizontal wall connecting the upper end of the first vertical wall to the lower end of the second vertical wall, a second horizontal annular wall connected to the upper end of the second vertical wall and to the lower end of the third vertical wall, and a third annular horizontal wall connected to the upper end of said third vertical wall and to said receptacle, said walls being disposed in step-like formation, and graduation markings on said horizontal walls to indicate the liquid capacity of said chambers.

2. A coffee beverage-making apparatus comprising a water-holding receptacle, said receptacle including a base, an electrical heating element supported on and projecting upwardly from said base, into said receptacle, a tubular fountain member disposed in said receptacle, said fountain member having a coffee container at one end and an enlarged tubular member at the other end, said enlarged tubular member enclosing said heating element to provide a heating well, a measuring unit disposed at the base of said receptacle, said unit comprising a plurality of vertical cylindrical walls, a first vertical wall having a certain internal diameter, said first wall encircling said heating element to provide a first chamber, second and third walls having progressively greater internal diameters to provide second and third chambers, a first annular horizontal wall connecting the upper end of the first vertical wall to the lower end of the second vertical wall, a second horizontal annular wall connected to the upper end of the second vertical wall and to the lower end of the third vertical wall, and a third annular horizontal wall connected to the upper end of said third vertical wall and to said receptacle, said walls being disposed in step-like formation.

3. A coffee beverage-making apparatus comprising a water-holding receptacle, said receptacle including a base, an electrical heating element supported on and projecting upwardly from said base, into said receptacle, a tubular fountain member disposed in said receptacle, said fountain member having a coffee container at one end and an enlarged tubular member at the other end, said enlarged tubular member enclosing said heating element to provide a heating well, a measuring unit disposed at the base of said receptacle, said unit comprising a plurality of vertical cylindrical walls, a first vertical wall having a certain internal diameter, said first wall encircling said heating element to provide a first chamber, a second wall having a progressively greater internal diameter to provide a second chamber, a first annular horizontal wall connecting the upper end of the first vertical wall to the lower end of the second vertical wall, a second horizontal annular wall connected to the upper end of the second vertical wall and to the receptacle, said walls being disposed in step-like formation.

4. A coffee beverage-making apparatus comprising a water-holding receptacle, said receptacle including a base, an electrical heating element supported on and projecting upwardly from said base, into said receptacle, a tubular fountain member disposed in said receptacle, said fountain member having a coffee container at one end and an enlarged tubular member at the other end, said enlarged tubular member enclosing said heating element to provide a heating well, a measuring unit disposed at the base of said receptacle, said unit comprising a plurality of vertical cylindrical walls, a first vertical wall having a certain internal diameter, said first wall encircling said heating element to provide a first chamber, a second wall having a progressively greater internal diameter to provide a second chamber, a first annular horizontal wall connecting the upper end of the first vertical wall to the lower end of the second vertical wall, a second horizontal annular wall connected to the upper end of the second vertical wall and to the receptacle, said walls being disposed in step-like formation, and graduation markings on one of said walls to indicate the liquid capacity of said chambers.

References Cited in the file of this patent

UNITED STATES PATENTS

| | | |
|---|---|---|
| 246,825 | Siffait | Sept. 6, 1881 |
| 1,601,403 | McGuire | Sept. 28, 1926 |
| 1,923,889 | Sauter | Aug. 22, 1933 |
| 1,944,303 | Rush | Jan. 23, 1934 |
| 1,974,676 | Hubbard | Sept. 25, 1934 |
| 2,011,102 | Fisher et al. | Aug. 13, 1935 |
| 2,020,104 | Collin | Nov. 5, 1935 |
| 2,657,300 | Sullivan | Oct. 27, 1953 |
| 2,694,770 | Sullivan | Nov. 16, 1954 |

FOREIGN PATENTS

| | | |
|---|---|---|
| 241,623 | Switzerland | Aug. 1, 1946 |